… …

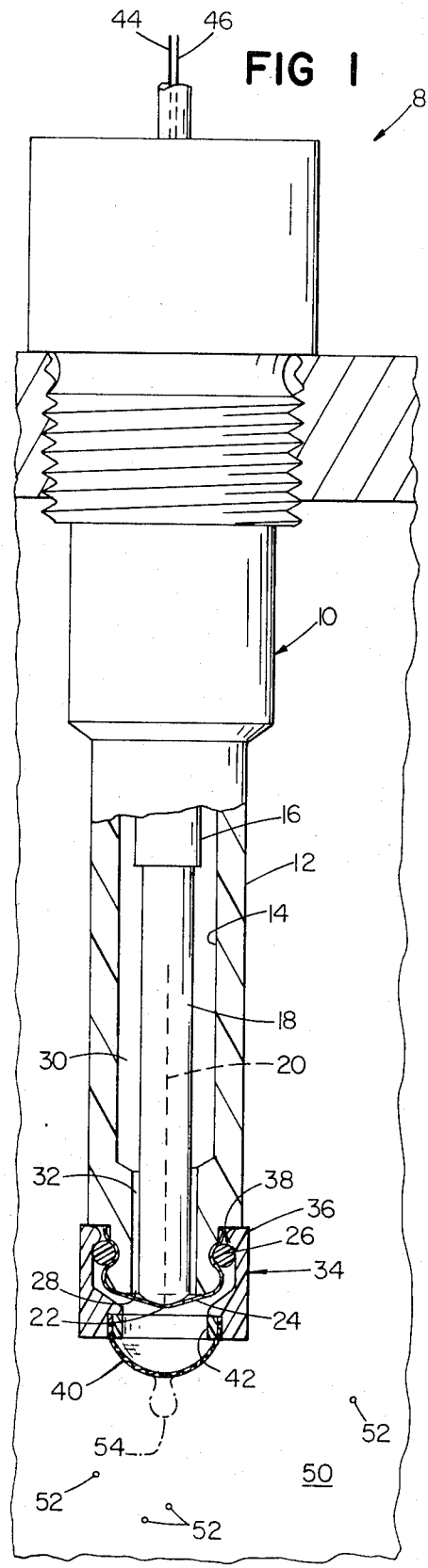
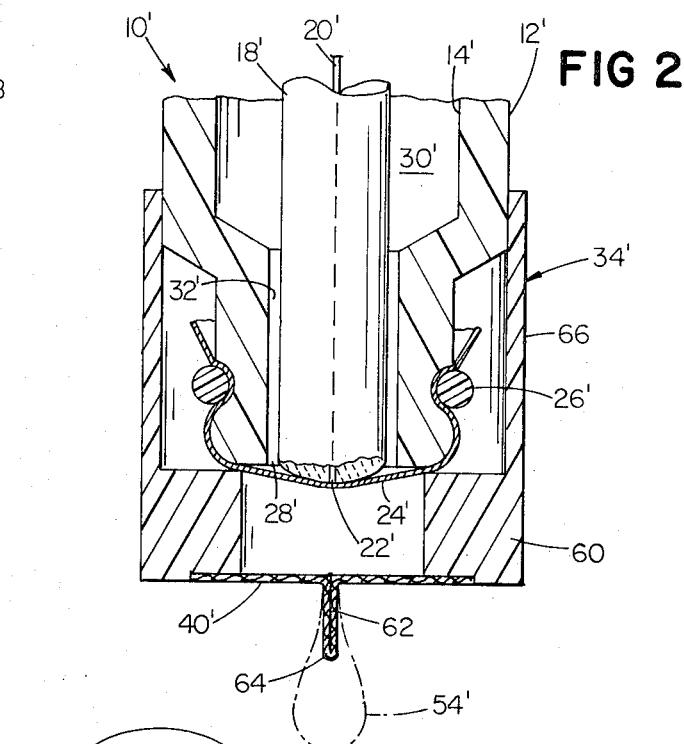
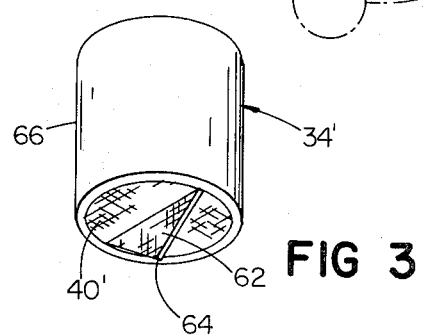
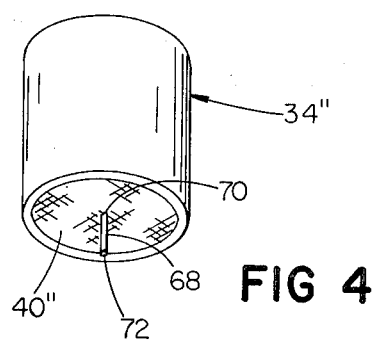

United States Patent Office 3,718,566
Patented Feb. 27, 1973

3,718,566
POLAROGRAPHIC ELECTRODE ASSEMBLY
William Michael Krebs, Waltham, Mass., assignor to Instrumentation Laboratory, Inc., Lexington, Mass.
Filed Jan. 7, 1971, Ser. No. 104,665
Int. Cl. G01n 27/30
U.S. Cl. 204—195 P          7 Claims

ABSTRACT OF THE DISCLOSURE

An electrochemical electrode assembly includes a housing defining an electrolyte chamber. The housing has an aperture in a wall and a selectively permeable membrane is disposed across the aperture. An electrode is supported within the chamber in close proximity to the membrane and a filter is supported on the housing and interposed between the membrane and test material in spaced relation to the membrane to intercept liquid particles while freely passing gas from the medium.

SUMMARY OF INVENTION

This invention relates to electrochemical analyzers of the type used to sense a constituent in a test medium, and more particularly to the type which have generally two electrodes disposed in a chamber that contains an electrolyte and that is typically bounded in part by a membrane that is permeable to the constituent to be sensed but impermeable to the electrolyte.

Polarographic analyzers of this type comprise a sensor which has anode and cathode electrodes which are spaced apart but electrically connected by means of the electrolyte. The electrolyte is held in a thin, continuous film over and between the anode and cathode by the membrane. When oxygen is the constituent to be sensed, a membrane such as polytetrafluoroethylene is employed and the amount of oxygen that passes through the membrane into the electrolyte is proportional to the partial pressure of the oxygen in the fluid or process stream to which the detector probe is exposed. The partial pressure of the oxygen is generally, although not strictly, representative of the amount of oxygen in the fluid. After the oxygen passes through the membrane it is reduced at the cathode and causes a current to flow through an external circuit to the anode, which current is substantially proportional to the partial pressure of the oxygen. Since the current is substantially proportional to the partial pressure of the oxygen present, it is also related to the concentration of oxygen in the fluid. In the absence of the constituent of interest, the sensor will quickly polarize and the current will fall to zero or a very low value. When the constituent of interest is present in the test medium, however, this constituent will diffuse through the membrane and depolarize the cell, resulting in current flow. The extent of depolarization and resulting current flow will depend on the concentration of the tested-for constituent in the test medium. For the accurate operation of a polarographic cell, it is critically important to maintain an invariant geometric relationship in the path between the test medium and the polarizing electrode. In a typical construction the permeable membrane is pressed against the polarizing electrode and only a thin film of electrolyte exists between the membrane and the electrode.

A serious difficulty is encountered when using such analyzers to measure gas concentration in an atmosphere containing particles of water, such as occurs, for instance, in measuring oxygen in a respirator humidifier. In such applications the response time and/or the calibration of the analyzer are frequently seriously degraded. It is a primary object of this invention to provide an improved electrochemical analysis instrument which may be used to measure concentrations of constituents of a medium containing suspended fluid drops. Another object is to provide a polarographic instrument with undegraded performance in a water drop enviroment.

The invention features an electrochemical analysis cell assembly comprising a housing defining an electrolyte chamber, the housing having an aperture, a selectively permeable membrane attached to the housing and covering the aperture, an electrode supported within the chamber in close proximity to the membrane, and a filter supported on the housing in spaced relation from the membrane and interposed between the membrane and a test medium to intercept fluid particles suspended in the medium while freely passing gas from the medium. In preferred embodiments the filter has a multiplicity of passages, the dimensions of which are less than about 100 microns, and the filter is spaced less than about ¼ inch from the membrane; the filter is a fine mesh screen configured to define a sump portion for concentration of fluid impinging on the filter and the filter is coated with a hydrophobic material such as a silicone wax. This assembly when used in environments of high humidity has markedly improved response time and calibration characteristics over prior assemblies. Other objects, features, and advantages will appear from the following description of particular embodiments of the invention taken together with the attached drawings in which:

FIG. 1 shows in partly cut away longitudinal section, an improved electrode assembly according to the invention for use in high humidity environment;

FIG. 2 shows in larger scale a cross-section of the tip of a second electrode assembly according to the invention;

FIG. 3 shows in perspective the tip of the assembly shown in FIG. 2; and

FIG. 4 shows an alternative tip for another embodiment of the invention.

DESCRIPTION OF PARTICULAR EMBODIMENTS

As shown in FIG. 1, $PO_2$ electrode assembly 8 includes a housing 10 having a cylindrical wall 12 defining an electrolyte chamber 14. Tubular silver chloride anodic electrode 16 is disposed in housing 10 and includes a large surface that extends into electrolyte chamber 14. Cylindrical glass envelope 18 extends distally from anodic electrode 16 and has sealed within it silver cathodic electrode 20 that is about 0.060 inch in cross section. The tip 22 of electrode 20 penetrates the end of envelope 18 and is exposed to electrolyte in electrolyte chamber 14. Membrane 24 of one mil polytetrafluoroethylene or similar oxygen permeable material is affixed by O-ring 26 to wall 12 to cover aperture 28 in wall 12. The membrane is permeable to oxygen ($O_2$) but not to contaminants or reducible ions of the sample to analyzed. Electrolyte 30 fills electrolyte chamber 14 and extends through passages 32 to form a thin film between membrane 24 and tip 22 of cathodic electrode 20. The configuration of cathodic electrode 20, membrane 24 and the thin layer of electrolyte are selected to minimize the effects of temperature, pH, pressure, viscosity and flow pattern of the sample to be analyzed.

Filter assembly 34 includes support ring 36 of thermoplastic material which has, at its upper end, rib 36 which snaps over O-ring 20 to secure assembly 34 to housing 10. Disposed at the lower end of ring 36 is a Type 304 stainless steel 250 mesh screen 40 that is hemispherical in configuration. The screen 40 is coated with a suitable hydrophobic material such as an RTV uncured silicone. The silicone preferably is applied by spraying or dipping screen 40 in a 2–3 weight percent solution of silicone in trichloroethylene. As the solvent is evaporating, a weak puff of air is directed through the screen to insure a multiplicity of open passages. In this embodiment the passage dimensions after coating, are in the order of 30–40 microns and the thickness of the coated screen is less than ten mils. The filter assembly 34 in position on housing 10, locates screen 40 about ⅛ inch from membrane 24. Screen 40 is secured to ring 36 by inner ring 42 that is fused to outer ring 36 thus firmly securing screen 40 in place.

Leads 44 and 46 are connected to electrodes 16 and 20, respectively, and run to conventional power supply and measurement equipment (not shown). In operation, the electrode assembly is disposed in contact with the test medium 50. Oxygen molecules in medium 38 pass freely through screen 40 into contact with membrane 24 and then diffuse through membrane 24 depolarizing electrode 22 and permitting current to flow from lead 44 to anode electrode 16, through the electrolyte to cathode electrode 22 and to lead 46. The magnitude of this current indicates the oxygen concentration in medium 50. Water particles 52 suspended in medium 50 are, however, too large to penetrate the interstices of screen 40 and therefore collect on the screen rather than passing through to membrane 24. As the water collects on screen 40, it drains downwards and forms a drop 54 on the sump portion 56 and drips off. Screen 40 is thus continually drained and, because of its hydrophobic surface, remains unclogged by water and freely passes the gas molecules from the medium 50.

A second embodiment is shown in FIGS. 2 and 3. The analyzing cell is similar in construction to the cell shown in FIG. 1 and similar components have been identified with corresponding primed numerals. Filter assembly 34' includes a support body having a base portion 60 to the lower surface of which screen 40' coated with hydrophobic material is adhered. A flat triangular sump portion 62 integral with screen 40' has downwardly directed tip 64. Extending up from base 60 is an annular sleeve 66, the upper end of which fits over the cylindrical outer surface of housing 10. The upper surface of base 60 contacts membrane 24' and thus provides a positive surface for locating screen 40' relative to membrane 24'.

FIG. 4 shows a third embodiment of the invention with screen 40" held in support ring 36" and having filamentary sump 68 with upper end 70 abutting and attached to screen 40" and lower end 72 extending downward.

Other embodiments will occur to those skilled in the art and are within the following claims.

What is claimed is:

1. An electrochemical electrode assembly comprising:
a housing defining an electrolyte chamber, said housing having an aperture in a wall thereof, a pair of spaced electrodes in said housing and adapted to be joined by an electrolyte, one of said electrodes being a sensing electrode with a forward end,
a selectively permeable membrane attached to said housing and covering said aperture to overlie the forward end of said sensing electrode, and
a filter supported on said housing in overlying and spaced relation to said membrane to intercept liquid particles suspended in a test medium while freely passing gas from said medium to said membrane, said filter including a sump portion for concentrating fluid impinging on said filter, and said sump portion including a downwardly directed, triangular portion having a side abutting said filter and an angle pointed downward for discharging fluid collected by said sump.

2. An electrochemical electrode assembly comprising:
a housing defining an electrolyte chamber, said housing having an aperture in a wall thereof, a pair of spaced electrodes in said housing and adapted to be joined by an eletcrolyte, one of said electrodes being a sensing electrode with a forward end,
a selectively permeable membrane attached to said housing and covering said aperture to overlie the forward end of said sensing electrode, and
a filter supported on said housing in overlying and spaced relation to said membrane to intercept liquid particles suspended in a test medium while freely passing gas from said medium to said membrane, said filter including a sump portion for concentrating fluid impinging on said filter, and said sump portion including a downwardly directed, filamentary portion having an end abutting said filter and a second end depending downward for discharging fluid collected by said sump.

3. An electrochemical electrode assembly comprising:
a housing defining an electrolyte chamber, said housing having an aperture in a wall thereof, a pair of spaced electrodes in said housing and adapted to be joined by an electrolyte, one of said electrodes being a sensing electrode with a forward end,
a selectively permeable membrane attached to said housing and covering said aperture to overlie the forward end of said sensing electrode, and
a filter supported on said housing in overlying and spaced relation to said membrane to intercept liquid particles suspended in a test medium while freely passing gas from said medium to said membrane, said filter being coated with a silicone wax to provide a hydrophobic surface.

4. An electrochemical electrode assembly comprising:
a housing defining an electrolyte chamber, said housing having an aperture in a wall thereof, a pair of spaced electrodes in said housing and adapted to be joined by an electrolyte, one of said electrodes being a sensing electrode with a forward end,
a selectively permeable membrane attached to said housing and covering said aperture to overlie the forward end of said sensing electrode, and
a filter supported on said housing in overlying and spaced relation to said membrane to intercept liquid particles suspended in a test medium while freely passing gas from said medium to said membrane, said filter being hemispherical in configuration and coated with a silicone wax to provide a hydrophobic surface.

5. The assembly as claimed in claim 4 wherein said filter has a multiplicity of passages, the dimensions of which are less than about 100 microns.

6. The assembly as claimed in claim 5 wherein said filter is spaced less than about ¼ inch from said membrane.

7. An electrochemical electrode assembly comprising:
a housing defining an electrolyte chamber, said housing having an aperture in a wall thereof, a pair of spaced electrodes in said housing and adapted to be joined by an electrolyte, one of said electrodes being a sensing electrode with a forward end,
a selectively permeable membrane attached to said housing and covering said aperture to overlie the forward end of said sensing electrode, and
a filter supported on said housing in overlying and spaced relation to said membrane to intercept liquid particles suspended in a test medium while freely passing gas from said medium to said membrane, said filter being a stainless steel screen coated with a silicone material to provide a hydrophobic surface, the passage dimensions being in the order of 30–40 microns and the thickness of the coated screen is less than 0.010 inch and said filter being spaced less than about ¼ inch from said membrane.

References Cited
UNITED STATES PATENTS

| | | | |
|---|---|---|---|
| 3,410,778 | 11/1968 | Krasberg | 204—195 P |
| 3,503,861 | 3/1970 | Volpe | 204—195 P |
| 3,278,408 | 10/1966 | Leonard et al. | 204—195 P |
| 3,509,034 | 4/1970 | Paine | 204—195 P |

GERALD L. KAPLAN, Primary Examiner